US011872812B2

(12) United States Patent
Iijima

(10) Patent No.: US 11,872,812 B2
(45) Date of Patent: Jan. 16, 2024

(54) LIQUID EJECTION HEAD AND LIQUID EJECTION DEVICE

(71) Applicant: TOSHIBA TEC KABUSHIKI KAISHA, Tokyo (JP)

(72) Inventor: Tomomi Iijima, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 44 days.

(21) Appl. No.: 17/537,898

(22) Filed: Nov. 30, 2021

(65) Prior Publication Data

US 2022/0234355 A1 Jul. 28, 2022

(30) Foreign Application Priority Data

Jan. 25, 2021 (JP) ................................ 2021-009850

(51) Int. Cl.
*B41J 2/14* (2006.01)
*B41J 2/03* (2006.01)

(52) U.S. Cl.
CPC ............ *B41J 2/14201* (2013.01); *B41J 2/03* (2013.01); *B41J 2002/14306* (2013.01); *B41J 2002/14338* (2013.01)

(58) Field of Classification Search
CPC ............................... B41J 2/14201; B41J 2/03; B41J 2002/14306; B41J 2002/14338; B41J 2002/14419; B41J 2/14145; B41J 2202/12; B41J 2/14209; B41J 2/14; B41J 2/17
See application file for complete search history.

(56) References Cited

U.S. PATENT DOCUMENTS

| | | | |
|---|---|---|---|
| 7,128,406 | B2 | 10/2006 | Dixon et al. |
| 9,527,310 | B2 | 12/2016 | Iijima |
| 2012/0256989 | A1 | 10/2012 | Uezawa et al. |

FOREIGN PATENT DOCUMENTS

| | | | |
|---|---|---|---|
| EP | 2821229 | A1 | 1/2015 |
| EP | 3868561 | A1 | 8/2021 |
| JP | 6033803 | B2 | 11/2016 |
| JP | 6181270 | B2 | 8/2017 |
| WO | 0038928 | A1 | 7/2000 |

OTHER PUBLICATIONS

IP.com search (Year: 2023).*
Global Dossier (Year: 2023).*
Extended European Search Report dated May 30, 2022, mailed in counterpart European Application No. 21215454.6, 7 pages.

* cited by examiner

*Primary Examiner* — Lisa Solomon
(74) *Attorney, Agent, or Firm* — Kim & Stewart LLP

(57) ABSTRACT

A liquid ejection head has a base plate with an actuator on an upper surface. Pressure chambers are formed in the actuator. A first common chamber connects to a first side of the pressure chambers, and a second common chamber connects to a second side. A nozzle plate is on an upper surface side of the actuator and has nozzles at positions corresponding to the pressure chambers. A supply hole is in the base plate and connected to the first common chamber. A discharge hole is in the base plate and connected to the second common chamber. A manifold is on a lower surface of the base plate. The manifold has a supply flow path for supplying liquid to the supply hole, a discharge flow path for receiving liquid from the discharge hole, and a temperature control flow path through which a temperature control liquid can flow.

19 Claims, 7 Drawing Sheets

LIQUID EJECTION HEAD AND LIQUID EJECTION DEVICE

CROSS-REFERENCE TO RELATED APPLICATION

This application is based upon and claims the benefit of priority from Japanese Patent Application No. 2021-009850, filed Jan. 25, 2021, the entire contents of which are incorporated herein by reference.

FIELD

Embodiments described herein relate generally to a liquid ejection head and a liquid ejection device.

BACKGROUND

Liquid ejection heads, such as ink jet heads, can be used in various liquid ejection devices. A liquid ejection head includes, for example, an actuator formed of a piezoelectric material that changes the pressure in a pressure chamber to eject a liquid, such as ink, from the pressure chamber. The liquid ejection head ejects liquid from a nozzle by operation of the actuator.

In recent years, the printing rate and printing speed of certain liquid ejection devices have been increasing. Therefore, the amount of heat generated in the pressure chamber of the liquid ejection head tends to increase. When the temperature of the pressure chamber rises, the temperature of the ink also increases, and thus the viscosity and other physical properties of the ink may change, which may affect printing. Heating of the ink (or other liquid) may cause the ink (or other liquid) to heat. It may be possible to cool the ink if the liquid ejection head is a circulating type liquid ejection head that circulates ink in and out of the head, but it is generally difficult to cool the ink if the liquid ejection head is a non-circulating type.

DETAILED DESCRIPTION

An object to be solved by an exemplary embodiment is to provide a liquid ejection head and a liquid ejection device capable of controlling the temperature of the ejected liquid.

In general, according to one embodiment, a liquid ejection head has a base plate with an actuator on an upper surface side of the base plate; a plurality of pressure chambers formed in the actuator; a first common chamber connected to a first side of the plurality of pressure chambers; a second common chamber connected to a second side of the plurality of pressure chambers, the pressure chambers connecting the first common chamber to the second common chamber; and a nozzle plate on an upper surface side of the actuator. The nozzle plate has a plurality of nozzles at positions respectively corresponding to the pressure chambers. A supply hole is in the base plate and connected to the first common chamber. A discharge hole is in the base plate and connected to the second common chamber. A manifold is on a lower surface side of the base plate. The manifold provides a liquid supply flow path for supplying liquid to the supply hole from a liquid feed port on a lower surface side of the manifold, a liquid discharge flow path for receiving liquid from the discharge hole, and a temperature control flow path through which a temperature control liquid can flow.

Hereinafter, a liquid ejection head according to certain example embodiments will be described with reference to the drawings. The drawings are not necessarily to scale and various changes, modifications, and alterations to the depicted aspects may be made without departing from the scope of the present disclosure.

Figure 1:
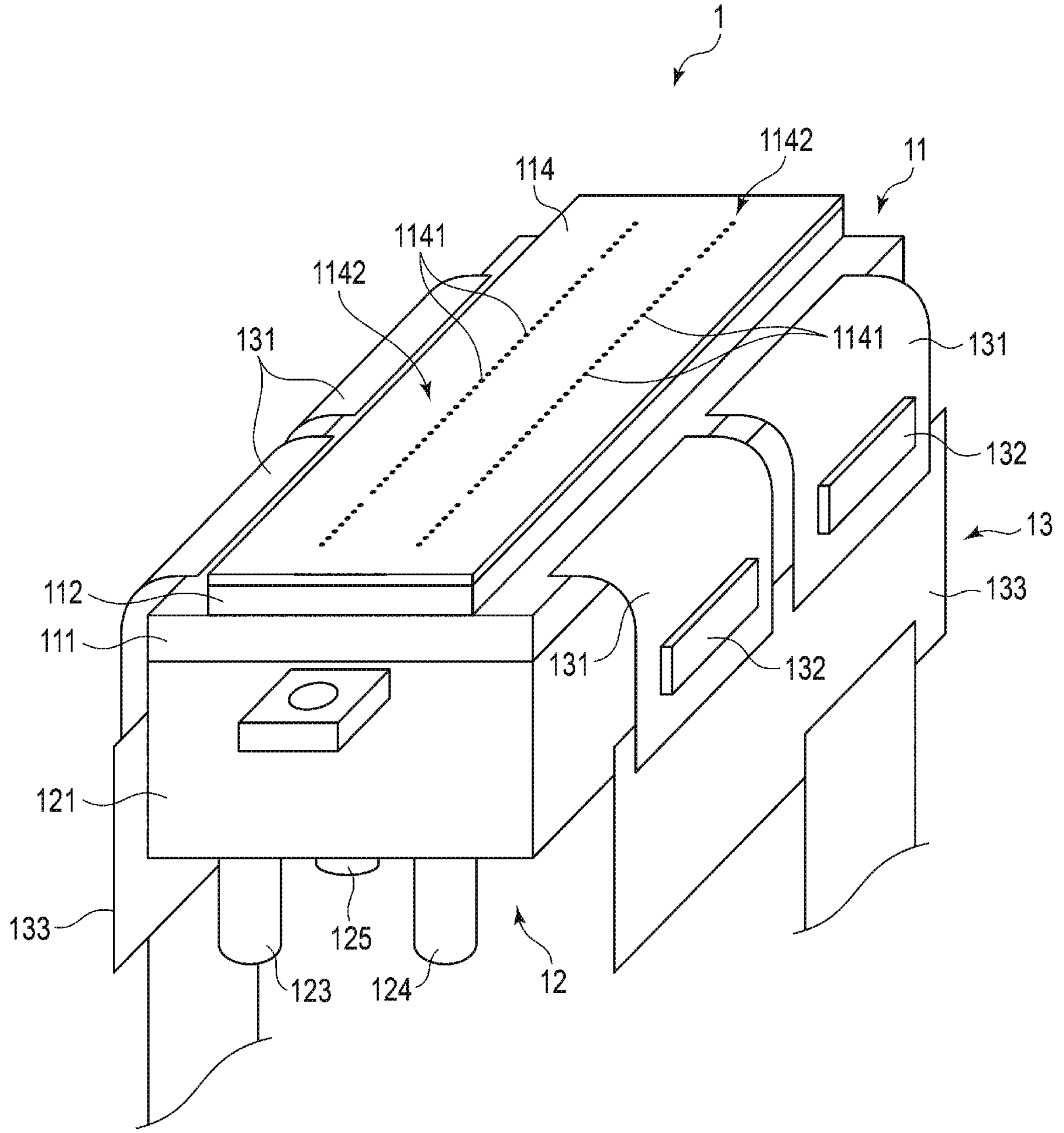
FIG. 1 is a perspective view illustrating a liquid ejection head according to an embodiment.
Figure 2:
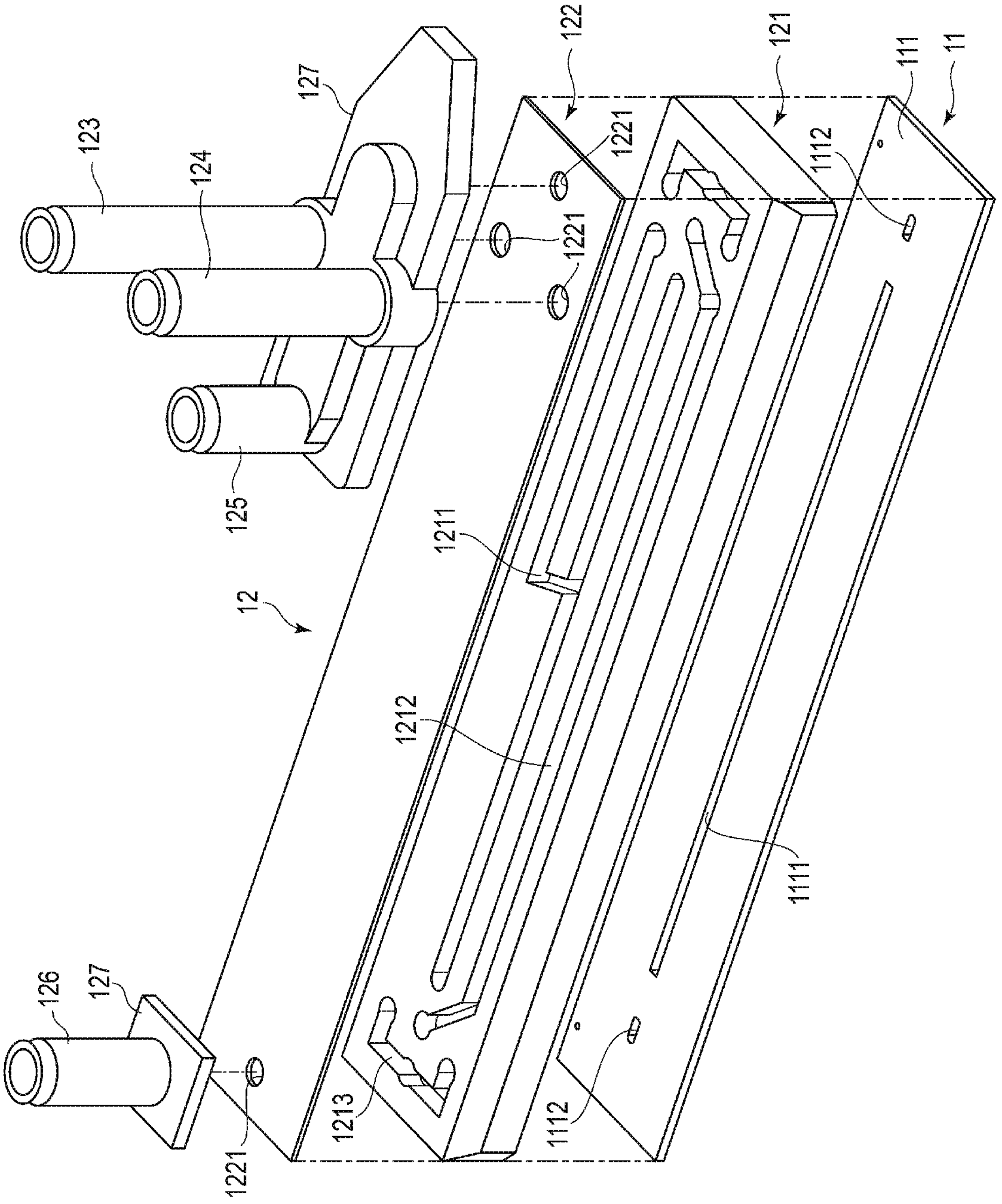
FIG. 2 is a perspective view illustrating a head body and a manifold unit of a liquid ejection head.
Figure 3:
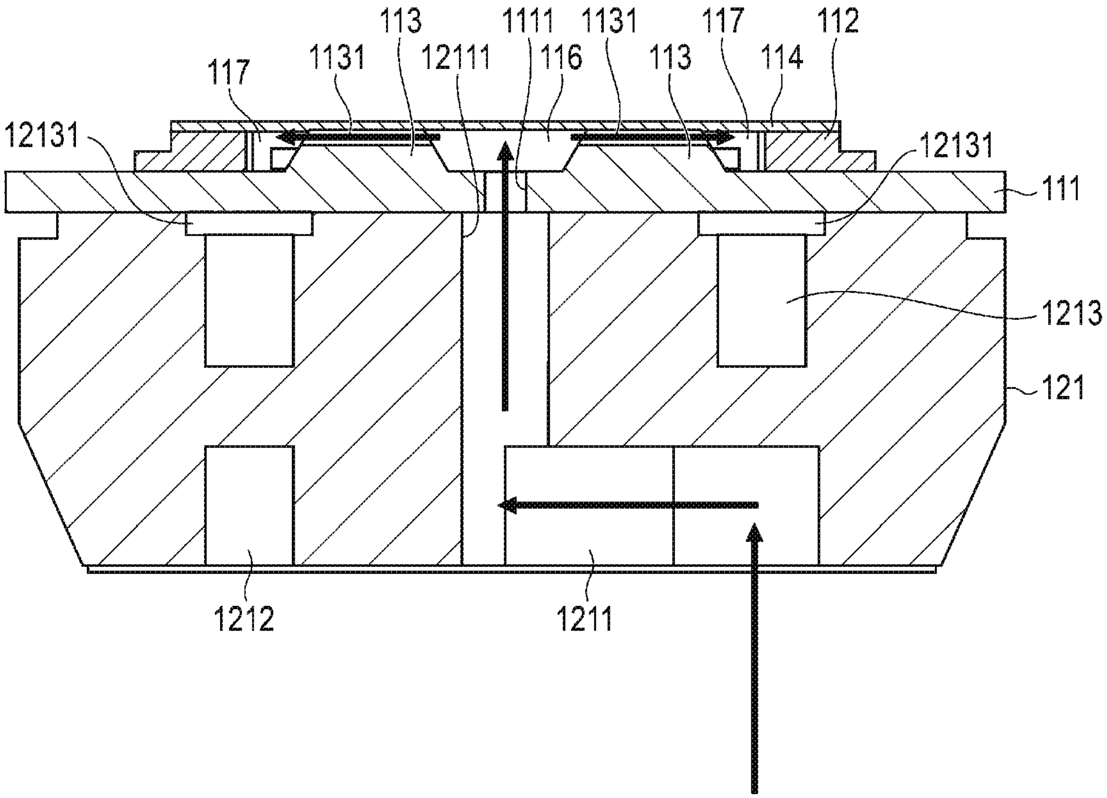
FIG. 3 is a cross-sectional view of a head body and a manifold.
Figure 4:
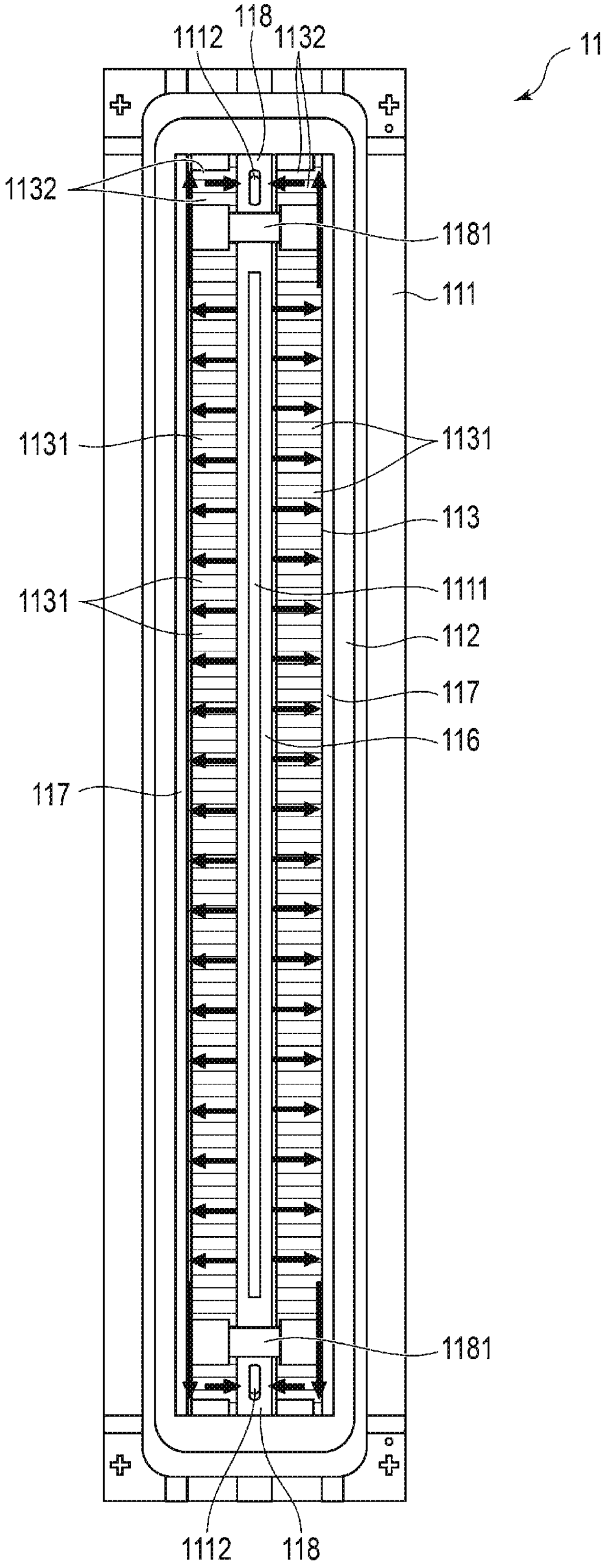
FIG. 4 is a plan view of a head body.
Figure 5:
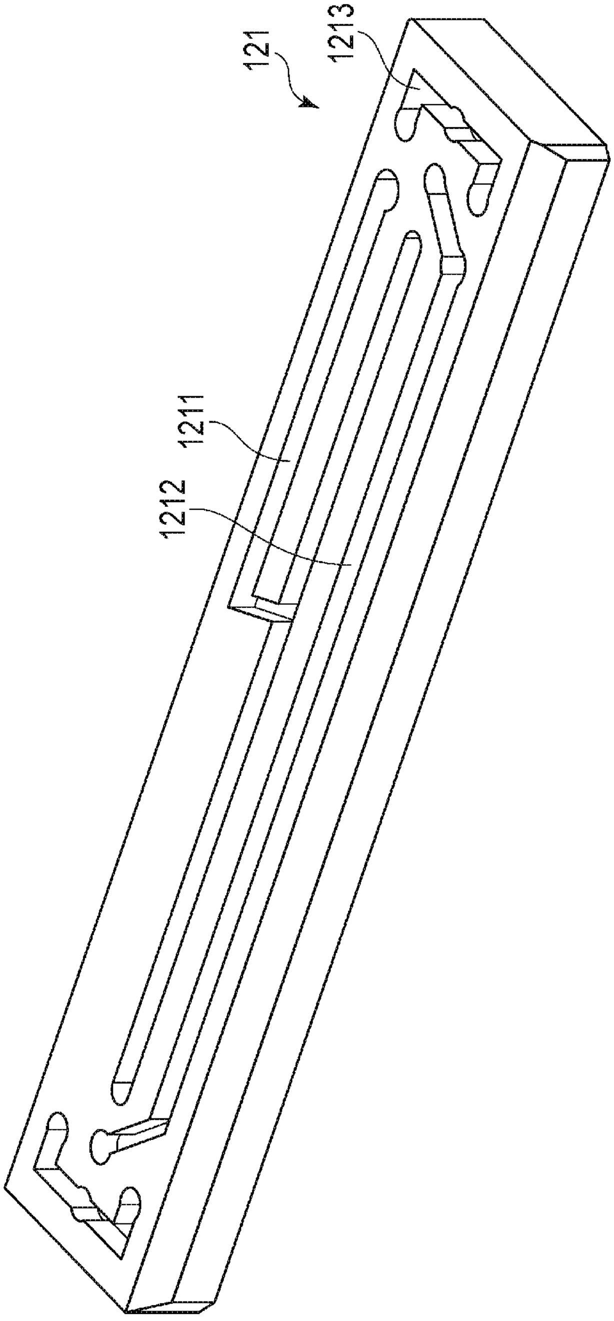
FIG. 5 is a perspective view of a manifold of a manifold unit.
Figure 6:
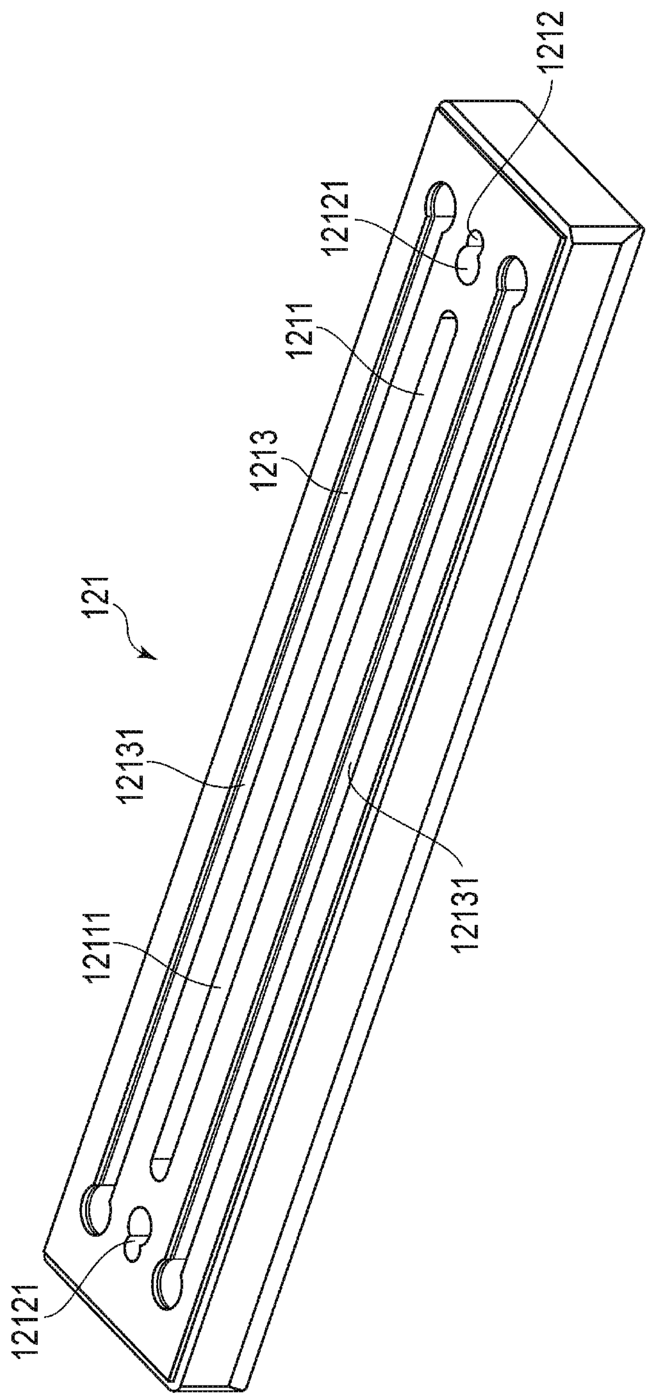
FIG. 6 is a perspective view illustrating a configuration of a manifold.

FIG. 1 is a perspective view illustrating a configuration of the liquid ejection head 1. FIG. 2 is a perspective view illustrating a head body 11 and a manifold unit 12 of the liquid ejection head 1. FIG. 3 is a cross-sectional view illustrating aspects of the configuration of the head body 11 and the manifold unit 12. FIG. 4 is a plan view of the head body 11. FIGS. 5 and 6 are perspective views of the manifold unit 12. FIGS. 5 and 6 are views of the manifold unit 12 illustrated from different directions.

Figure 7:
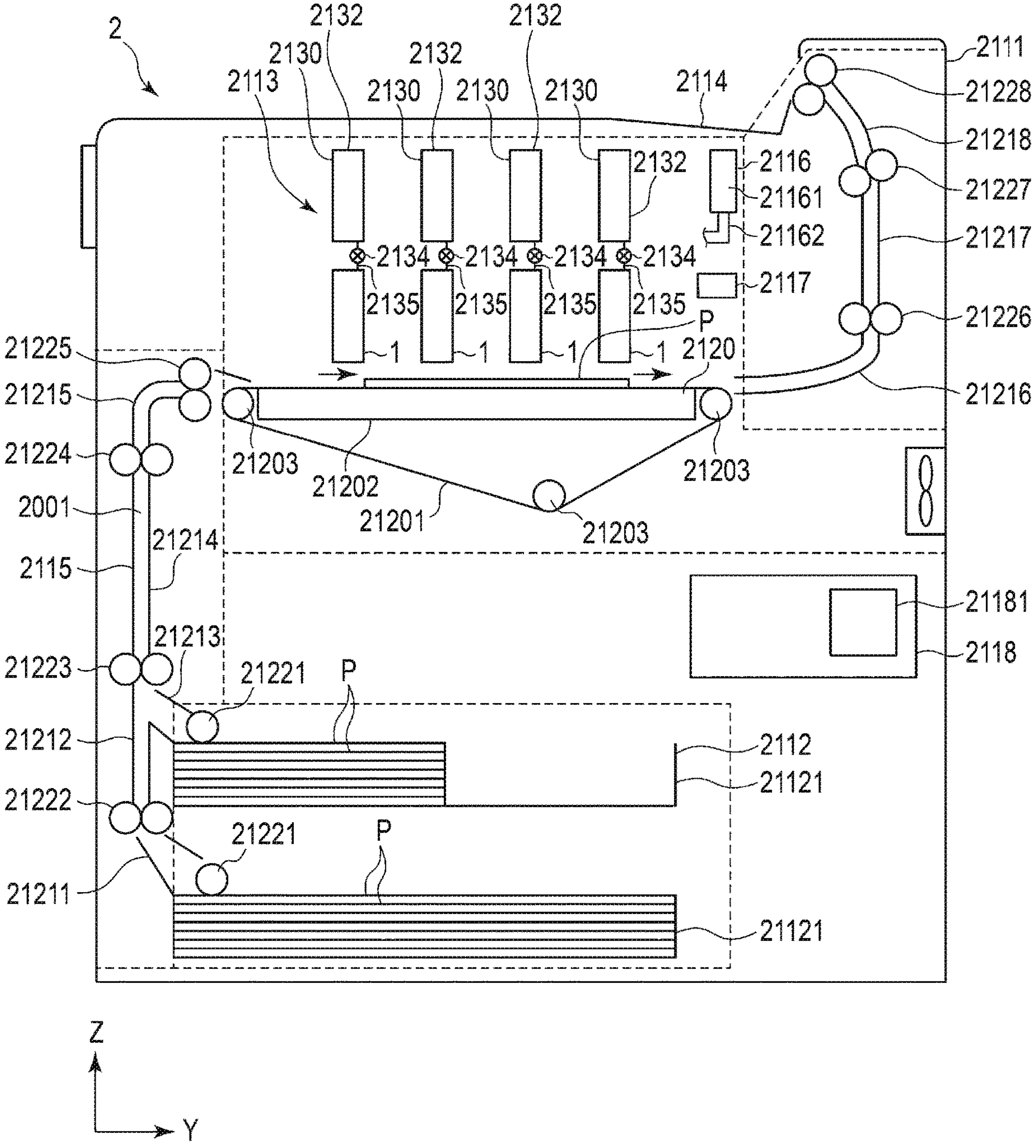
FIG. 7 depicts a liquid ejection device of an embodiment.

The liquid ejection head 1 is, for example, an ink jet head in a liquid ejection device 2. The liquid ejection device 2 may be an ink jet recording device such as illustrated in FIG. 7. The liquid ejection head 1 is provided in a head unit 2130. The head unit 2130 includes a supply tank 2132 for storing a liquid in the liquid ejection device 2.

The liquid ejection head 1 is supplied with ink from the supply tank 2132. The liquid ejection head 1 may be a circulating type head that circulates ink, or may be a non-circulating type head that does not circulate ink. In the present example, the liquid ejection head 1 will be described as a non-circulating type head. The liquid ejection head 1 is connected to a temperature control device 2116 provided in the liquid ejection device 2. A temperature control liquid for controlling the temperature of the ink can be supplied. The temperature control liquid may be water, for example.

The liquid ejection head 1 illustrated in FIGS. 1 to 3 includes a head body 11, a manifold unit 12, and a circuit board 13. In some examples, the liquid ejection head 1 may include a cover for accommodating at least part of the head body 11, the manifold unit 12, and the circuit board 13.

The head body 11 ejects a liquid. The head body 11 includes a base plate 111, a frame 112, an actuator 113 having a plurality of first pressure chambers 1131 and a plurality of second pressure chambers 1132, and a nozzle plate 114.

The head body 11 includes a first common liquid chamber 116 that communicates with the primary side of the first pressure chambers 1131 of the actuator 113 and a second common liquid chamber 117 that communicates with the secondary side of the first pressure chambers 1131 and the primary side of the second pressure chambers 1132 (see FIG. 4). The head body 11 also includes a third common liquid chamber 118 that communicates with the secondary side of the second pressure chambers 1132. The primary side of the first pressure chambers 1131 is the upstream side with respect to the direction in which the liquid flows through the head body in normal operation. The secondary side of the first pressure chambers 1131 is the downstream side. The primary side of the second pressure chambers 1132 is the upstream side. The secondary side of the plurality of second pressure chambers 1132 is the downstream side.

In the present embodiment, the head body 11 includes a pair of actuators 113, one first common liquid chamber 116 between the pair of actuators 113, a pair of second common liquid chambers 117 (one on each side of the pair of actuators 113), and a pair of third common liquid chambers 118 (one on each end of the pair of actuators 113).

The base plate 111 is formed in a square plate shape of, for example, a ceramic material. The base plate 111 includes one or more supply holes 1111 and one or more discharge holes 1112. The supply hole(s) 1111 and the discharge hole(s) 1112 are through holes penetrating the base plate 111.

A supply hole 1111 is provided, for example, at a position facing the first common liquid chamber 116. The supply hole 1111 is, for example, an elongated hole or slot with its long dimension along the longitudinal direction of the first common liquid chamber 116.

A discharge hole 1112 is provided, for example, at positions facing each third common liquid chamber 118. The discharge hole 1112 is provided in the base plate 111 adjacent to second pressure chambers 1132 at each end of the base plate 111.

The frame 112 is fixed to one side of the base plate 111 with an adhesive or the like. The frame 112 surrounds the supply hole 1111, the discharge holes 1112, and the actuators 113 on the base plate 111.

For example, the frame 112 is formed in a rectangular frame shape. The actuators 113, the supply hole 1111, and the discharge holes 1112 are positioned to be inside the opening of the frame 112.

Each actuator 113 is formed in a plate shape. Each actuator 113 is disposed in the opening of the frame 112 and adhered to the base plate 111. The actuators 113 comprise rectangular plate-shaped piezoelectric materials adhered to each other so as to face each other with the polarization directions thereof opposite to each other.

In this context, the piezoelectric material is, for example, lead zirconate titanate (PZT). Each actuator 113 has a plurality of first pressure chambers 1131 disposed at equal intervals along the length direction of the base plate 111. The first pressure chambers 1131 are disposed in two rows on each side of the centerline of the base plate 111. Each actuator 113 also has a plurality of second pressure chambers 1132 disposed at both ends of the base plate 111. The second pressure chambers 1132 at each end are at equal intervals and in two rows on both sides of the centerline of the baseplate 111 like the first pressure chambers 1131. Each actuator 113 can be said to have a plurality of grooves formed on the main surface side opposite to the base plate 111 side. The first pressure chambers 1131 and the second pressure chambers 1132 are formed in these grooves. Further, each actuator 113 is formed in conjunction with a wiring pattern for driving each pressure chamber 1131.

A first pressure chamber 1131 used as a pressure chamber for ejecting ink from a corresponding nozzle 1141 during printing or the like. A second pressure chamber 1132 is a maintenance pressure chamber used for ejecting ink from a nozzle 1141 during a maintenance operation.

The nozzle plate 114 is a plate shape. The nozzle plate 114 is fixed to the frame 112 with an adhesive or the like. The nozzle plate 114 has a plurality of nozzles 1141 formed at positions facing the first pressure chambers 1131 and the second pressure chambers 1132. In the present embodiment, the nozzle plate 114 includes two nozzle rows 1142 each with a plurality nozzles 1141 arranged in a line.

Among the plurality of nozzles 1141, the those facing the plurality of first pressure chambers 1131 are holes for ejecting ink during printing operations or the like. Among the plurality of nozzles 1141, the those facing the plurality of second pressure chambers 1132 are holes used for purging ink during maintenance operations or the like.

The first common liquid chamber 116 is formed between the facing pair of actuators 113. The first common liquid chamber 116 does not extend all the way to the ends of the actuators 113. The first common liquid chamber 116 forms an ink flow path from the supply hole 1111 to the primary (entrance) side of the plurality of first pressure chambers 1131 of each actuator 113.

A second common liquid chamber 117 is formed to be between the frame 112 and the outside of each actuator 113. The second common liquid chamber 117 forms an ink flow path from the secondary (exit) side of the plurality of first pressure chambers 1131 to the primary side of some of the plurality of second pressure chambers 1132.

The third common liquid chamber 118 is separated from the first common liquid chamber 116 by, for example, a partition wall 1181. A third common liquid chamber 118 is formed between the end portions of the pair of actuators 113, and forms an ink flow path from the secondary (exit) side of the second pressure chambers 1132 at each end of actuators 113 to a discharge hole 1112.

The manifold unit 12 includes a manifold 121, a top plate 122, an ink supply pipe 123, an ink discharge pipe 124, a temperature control water supply pipe 125, a temperature control water discharge pipe 126, and a base block 127. The number of ink supply pipes 123 (alternatively, liquid supply pipes 123 when a liquid other than ink is utilized), ink discharge pipes 124 (alternatively, liquid discharge pipes 124 when a liquid other than ink is utilized), temperature control water supply pipes 125, and temperature control water discharge pipes 126 can be arbitrarily set.

In the present embodiment, the manifold unit 12 includes one ink supply pipe 123, one ink discharge pipe 124, one temperature control water supply pipe 125, and one temperature control water discharge pipe 126, but other examples may vary in these numbers.

As illustrated in FIGS. 5 and 6, the manifold 121 can be formed in a plate shape or a block shape. The manifold 121 includes an ink supply flow path 1211 (liquid supply flow path), an ink discharge flow path 1212 (liquid discharge flow path), and a temperature control flow path 1213. One side of the manifold 121 is fixed to the base plate 111. The ink supply pipe 123, the ink discharge pipe 124, the temperature control water supply pipe 125, and the temperature control water discharge pipe 126 are attached to the manifold 121 via the base block(s) 127 (FIG. 3).

The ink supply flow path 1211 is formed in the manifold 121 as holes and grooves. The ink supply flow path 1211 fluidly connects the ink supply pipe 123 and the supply hole 1111 of the base plate 111.

The ink supply flow path 1211 includes an ink supply opening 12111 (FIG. 3) that is longer in one direction. The ink supply opening 12111 is provided in the surface of the manifold 121 to which the base plate 111 is fixed. The ink supply opening 12111 matches in position to the region provided with the supply hole 1111 disposed in the first common liquid chamber 116.

In the present embodiment, the ink supply flow path 1211 extends in the longitudinal direction from the ink supply point (where ink is supplied from the ink supply pipe 123) in one branch towards the center of the manifold 121. A portion of the ink supply flow path 1211 then extends in the lateral (width) direction of the manifold 121 to connect to a slit that extends along the longitudinal direction of the first common liquid chamber 116 in the center of the manifold 121. This central slit can be considered as a portion of the ink supply flow path 1211. The base plate 111 side end of this slit forms the ink supply opening 12111.

The ink discharge flow path 1212 is a flow path formed in the manifold 121 by holes and grooves. The ink discharge flow path 1212 fluidly connects the ink discharge pipe 124 and the discharge holes 1112.

The ink discharge flow path 1212 includes two ink discharge openings 12121 (see FIG. 6) on the surface of the manifold 121 to which the base plate 111 is fixed. The two ink discharge openings 12121 match each of the regions provided with the discharge holes 1112. A discharge hole 1112 is disposed in correspondence with each of the third common liquid chambers 118, respectively. In the ink discharge flow path 1212, the two ink discharge openings 12121 communicate with each other by a groove in the surface of the manifold 121 opposite from that to which the base plate 111 is fixed.

The temperature control flow path 1213 is a flow path formed in the manifold 121 by holes and grooves. The temperature control flow path 1213 fluidly connects the temperature control water supply pipe 125 and the temperature control water discharge pipe 126.

The ends of the temperature control flow path 1213 are openings connected to the temperature control water supply pipe 125 and the temperature control water discharge pipe 126. The control flow path 1213 is formed so as to permit the exchange of heat with the base plate 111 when fixed to the manifold 121.

That is, a part of the temperature control flow path 1213 is provided as a groove in the surface of the manifold 121 to which the base plate 111 is fixed. In the present embodiment, the temperature control flow path 1213 has a configuration in which a pair of temperature control water openings 12131 are provided in the surface of the manifold 121 to which the base plate 111 is fixed. The primary (entrance) side and the secondary (exit) side of the temperature control water openings 12131 communicate with each other via a groove in the surface opposite from the side of the manifold 121 to which the base plate 111 is fixed.

The temperature control water opening 12131 can be provided in a region corresponding to the pressure chambers 1131 and 1132 of the base plate 111, or a region corresponding to the second common liquid chamber 117 of the base plate 111. Heat is generated by the driving of the first pressure chambers 1131, and the temperature of the first pressure chamber 1131 and thus the temperature of the ink in the first pressure chamber 1131 and on the secondary side (second common liquid chamber 117) of the first pressure chamber 1131 rise. Therefore, the temperature control of at least either the plurality of first pressure chambers 1131 or the second common liquid chamber 117 is generally required.

In the present embodiment, a temperature control water opening 12131 is provided in the region corresponding to each of the second common liquid chambers 117. Particularly, the temperature control flow path 1213 is provided with two different temperature control water openings 12131 with branches into two at the side to which the temperature control water supply pipe 125 is connected from the side to which the base plate 111 is fixed.

That is, the manifold 121 of the present embodiment includes a pair of temperature control water openings 12131 formed on the side to which the base plate 111 is fixed. The temperature control water openings 12131 form a part of the temperature control flow path 1213. When manifold 121 and the base plate 111 are fixed to each other, the water flowing through each temperature control water opening 12131 exchanges heat with a region corresponding to second common liquid chambers 117 of the base plate 111. In this way, a temperature control flow path 1213 that connects the temperature control water supply pipe 125 and the temperature control water discharge pipe 126 is formed.

The top plate 122 is provided on the surface of the manifold 121 opposite from the base plate 111. The top plate 122 covers the manifold 121 to seal the ink supply flow path 1211, the ink discharge flow path 1212, and the temperature control flow path 1213. The top plate 122 includes openings 1221 at positions facing the primary side and the secondary side of the ink supply flow path 1211, the ink discharge flow path 1212, and the temperature control flow path 1213. These openings 1221 permit the flow paths 1211, 1212, and 1213 to be fluidly connected to the pipes 123, 124, 125, and 126.

The ink supply pipe 123 is connected to the ink supply flow path 1211 via a base block 127 and an opening 1221 of the top plate 122. The ink discharge pipe 124 is connected to the ink discharge flow path 1212 via a base block 127 and an opening 1221 of the top plate 122. The temperature control water supply pipe 125 is connected to the primary side of the temperature control flow path 1213 via a base block 127 and an opening 1221 of the top plate 122. The temperature control water discharge pipe 126 is connected to the second side of the temperature control flow path 1213 via a base block 127 and an opening 1221 of the top plate 122.

In the present embodiment, the ink supply pipe 123, the ink discharge pipe 124, and one of the temperature control water supply pipe 125 or the temperature control water discharge pipe 126 are all disposed at one end of the manifold 121. The other one of the temperature control water supply pipe 125 or the temperature control water discharge pipe 126 is disposed on the other end of the manifold 121. In the present example, the temperature control water supply pipe 125 is grouped on the end of the manifold 121 with the ink supply pipe 123 and the ink discharge pipe 124, and the temperature control water discharge pipe 126 is provided alone on the other end of the manifold 121.

The ink supply pipe 123 and the ink discharge pipe 124 are disposed side by side with one another in the lateral (width) direction of the manifold 121. The temperature control water supply pipe 125 is disposed adjacent to the ink supply pipe 123 and the ink discharge pipe 124. In this example, the temperature control water supply pipe 125 is disposed closer to the center of the manifold 121 than the ink supply pipe 123 and the ink discharge pipe 124.

In the present example, two separate base blocks 127 are provided. One base block 127 supports the ink supply pipe 123, the ink discharge pipe 124, and the temperature control water supply pipe 125. The other base block 127 supports the temperature control water discharge pipe 126. Each base block 127 is fixed to the top plate 122. For example, the base block 127 includes a flow path therein, and fluidly connects a supported pipe to an opening 1221 in the top plate 122.

The circuit board 13 includes a wiring film 131 with one end connected to the wiring pattern of the actuator 113. A driver IC 132 of the circuit board 13 is mounted on the wiring film 131, and a printed wiring board 133 of the circuit board 13 is mounted on the other end of the wiring film 131 opposite from the end connected to the wiring pattern of the actuator.

The circuit board 13 drives the actuator 113 by applying a drive voltage to the wiring pattern of the actuators 113 by using the driver IC 132. The driving of an actuator 113 in this manner increases or decreases the volume of the pressure chamber(s) 1131, which can operate to eject liquid droplets from a nozzle 1141.

A plurality of wiring films 131 can be provided, for example. In the present embodiment, two wiring films 131 are connected to each actuator 113. The wiring film 131 is, for example, a Chip on Film (COF) on which the driver IC 132 is mounted. The driver IC 132 is electrically connected to the wiring pattern (electrodes) formed in the pressure chambers 1131 via the wiring film 131. The printed wiring board 133 can be a printing wiring assembly (PWA) on which various electronic components and connectors are mounted.

The liquid ejection head 1 can be incorporated in, for example, an ink jet recording device 2 such as illustrated in FIG. 7 or other type of the liquid ejection device. The liquid ejection head 1 is connected to the supply tank 2132 provided in the ink jet recording device 2. The liquid ejection head 1 can be a circulating type head that circulates ink to and from the supply tank 2132 through the liquid ejection head 1 or a non-circulating type head that is supplied with ink from the supply tank 2132 and then discharges ink into a maintenance device 2117 during maintenance operations. The liquid ejection head 1 is disposed, for example, in a posture in which the nozzles 1141 of the nozzle plate 114 faces downward towards a recording medium (e.g., a sheet or paper) or the like.

As depicted in FIG. 7, the ink jet recording device 2 includes a housing 2111, a medium supply unit 2112, an image forming unit 2113, a medium discharge unit 2114, a conveyance device 2115, a temperature control device 2116, a maintenance device 2117, and a control unit 2118.

The ink jet recording device 2 in this example is an ink jet printer that performs an image forming process on paper P by ejecting a liquid, such as ink, while paper P is being conveyed along a predetermined conveyance path 2001 from the medium supply unit 2112 to the medium discharge unit 2114 through the image forming unit 2113.

The medium supply unit 2112 includes a plurality of paper feeding cassettes 21121. The image forming unit 2113 includes a support unit 2120 (that supports paper thereon during the printing process) and a plurality of head units 2130 that are disposed adjacent to each other above the support unit 2120. The medium discharge unit 2114 includes a paper discharge tray 21141.

The support unit 2120 includes a conveyance belt 21201 provided in a loop shape, a support plate 21202 for supporting the conveyance belt 21201 from the back side, and a plurality of belt rollers 21203 provided on the back side of the conveyance belt 21201.

Each head unit 2130 includes a liquid ejection head 1, a supply tank 2132 connected to the liquid ejection head 1, a pump 2134 for supplying ink, and a connection flow path 2135 connecting the liquid ejection head 1 and the supply tank 2132.

In the present embodiment, liquid ejection heads 1 for four colors (cyan, magenta, yellow, and black) are provided, and thus four supply tanks 2132 accommodating ink of each of these four colors are provided. Each supply tank 2132 is connected to the liquid ejection head 1 by a connection flow path 2135.

The pump 2134 is a liquid feed pump composed of, for example, a piezoelectric pump. The pump 2134 is connected to the control unit 2118 and can be driven and controlled by the control unit 2118.

Each connection flow path 2135 includes a supply flow path connected to the ink supply pipe 123 of the liquid ejection head 1. The connection flow path 2135 also includes a collection flow path connected to the ink discharge pipe 124 of the liquid ejection head 1. If the liquid ejection head 1 is a circulating type, the collection flow path will be connected to the supply tank 2132. If the liquid ejection head 1 is a non-circulating type, the collection flow path will be connected to the maintenance device 2117.

The conveyance device 2115 conveys the paper P along the conveyance path 2001 from the paper feeding cassette 21121 to the paper discharge tray 21141 through the image forming unit 2113. The conveyance device 2115 includes guide plate pairs 21211 to 21218 (guide plate pairs 21211, 21212, 21213, 21214, 21215, 21216, 21217, 21218) and conveyance rollers 21221 to 21228 (conveyance rollers 21221, 21222, 21223, 21224, 21225, 21226, 21227, 21228) disposed at different points along the conveyance path 2001. The conveyance device 2115 supports the paper P so that the paper can be moved relative to the liquid ejection head 1.

The temperature control device 2116 includes a temperature control water tank 21161, a temperature control flow circuit 21162 (such as pipes and tubes) for supplying temperature control water, a pump that supplies the temperature control water, a temperature controller that adjusts the temperature of temperature control water, and the like. The temperature control device 2116 supplies the temperature control water from the temperature control water tank 21161 at a predetermined temperature controlled by the temperature controller to the temperature control water supply pipe 125 via the temperature control flow circuit 21162 by action of the pump. The temperature control device 2116 also collects the water discharged from the temperature control water discharge pipe 126 through the manifold 121 back into the temperature control water tank 21161 via the temperature control flow circuit 21162. The temperature controller is, for example, a heater or a cooler.

The maintenance device 2117 functions during maintenance to suction and collect ink remaining on the outer surface of the nozzle plate 114, for example. If the liquid ejection head 1 is a non-circulating type, the maintenance device 2117 collects ink in the head body 11 through a nozzle(s) 1141 facing the second pressure chambers 1132 during maintenance. The maintenance device 2117 includes a tray, a tank, or the like for storing the collected ink.

The control unit 2118 includes a CPU 21181 (one example of a processor), a memory such as a read only memory (ROM) for storing various programs, a random access memory (RAM) for temporarily storing various data and image data, and an interface unit for data input from the outside and data output to the outside.

Next, the flow of ink and the flow of temperature control water for temperature control of the liquid ejection head 1 will be described. First, when the ink supplied to the ink supply pipe 123, the ink flows through the two ink supply flow paths 1211 of the manifold 121. Then, the ink moves from the supply hole 1111 of the base plate 111 facing the ink supply opening 12111 of the ink supply flow path 1211 to the first common liquid chamber 116.

The ink that has moved to the first common liquid chamber 116 moves to the second common liquid chamber 117 by passage through the plurality of first pressure chambers 1131 as illustrated by arrows in FIG. 4. If a first pressure chamber 1131 is driven, the ink in the first pressure chamber 1131 will be ejected from the nozzle 1141. Any ink not ejected from the nozzle 1141 moves to the corresponding second common liquid chamber 117.

When the liquid ejection head 1 is a non-circulating type, the ink in the second common liquid chamber 117 moves to the third common liquid chamber 118 via second pressure chambers 1132 and accumulates in the third common liquid chamber 118. Then, if the secondary side of the ink discharge pipe 124 is opened during maintenance or the like, the ink in the second common liquid chamber 117 moves to the ink discharge pipe 124 through the discharge hole 1112 of the base plate 111 and the ink discharge flow path 1212 of the manifold 121. Furthermore, by driving a second pressure chamber 1132 during maintenance or the like, the ink in the second pressure chamber 1132 will be ejected together with air accumulated in the second common liquid chamber 117 and the third common liquid chamber 118, for example, this operates to bleed air from the liquid ejection head 1.

When the liquid ejection head 1 is a circulating type, the third common liquid chamber 118 is not necessarily provided, and the discharge hole 1112 can be provided in the second common liquid chamber 117. The ink in the second common liquid chamber 117 moves to the ink discharge pipe 124 through the discharge hole 1112 of the base plate 111 and the ink discharge flow path 1212 of the manifold 121.

If water (temperature control water) is supplied to the temperature control water supply pipe 125, the water flows through the temperature control flow path 1213 of the manifold 121 and moves to the temperature control water discharge pipe 126. The water comes into contact with the base plate 111 at the temperature control water opening 12131, exchanges heat with the base plate 111, and which can cool the base plate 111 or otherwise regulates temperature of the base plate 111.

As a result, the ink in the plurality of pressure chambers 1131 and 1132 along with the pressure chambers 1131 and 1132 themselves can be cooled. Alternatively, ink of the second common liquid chamber 117 can be cooled. In some examples, the water (temperature control water) may be utilized to heat the ink instead of cooling the ink. That is, the temperature control water may be either cooled or heated to maintain the temperature of the ink at a level suitable for ejection from the nozzles. In some examples, the ink may be heated before the pressure chamber 1131 is driven, and then cooled after the pressure chamber 1131 is driven.

With the liquid ejection head 1 and the liquid ejection device 2 configured in this way, it is possible to control the temperature of the ink regardless of whether a circulating type or a non-circulating type liquid ejection head 1 is adopted.

In an above-described example, the head body 11 was described as a non-circulating type, but the head body 11 may be a circulating type instead. The head body 11 in some examples may have a configuration that does not include the third common liquid chamber 118.

In an above-described example, the flow of ink in one system for supplying ink from one first common liquid chamber 116 to a pair of actuators 113 was described, but the present disclosure is not limited thereto. For example, the flow of ink in two systems may be adopted, with one first common liquid chamber 116 being provided for each actuator 113. Such a liquid ejection head 1 may include, for example, two ink supply pipes 123 and two ink discharge pipes 124, and two ink supply flow paths 1211 and two ink discharge flow paths 1212 in the manifold 121.

The flow paths in manifold unit 12 can be varied in number and type as appropriate. That is, the shape and configuration of the ink supply flow path 1211, the ink discharge flow path 1212, the temperature control flow path 1213, and the positioning of pipes 123, 124, 125, and 126 can be appropriately varied in the manifold unit 12 to correspond to the configuration of the head body 11 and the common liquid chambers 116, 117, and 118.

The liquid ejection head 1 and the liquid ejection device 2 are not limited to applications in recording devices and/or ink jet printers. That is, the liquid ejection head 1 and the liquid ejection device 2 can be used, for example, in a 3D printer, an industrial manufacturing machine, and medical applications, and the temperature of the liquid ejected from the head body 11 can be controlled according to embodiments of the present disclosure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:
- a base plate with an actuator on an upper surface side of the base plate;
- a plurality of pressure chambers formed in the actuator;
- a first common chamber connected to a first side of the plurality of pressure chambers;
- a second common chamber connected to a second side of the plurality of pressure chambers, the pressure chambers connecting the first common chamber to the second common chamber;
- a nozzle plate on an upper surface side of the actuator and having a plurality of nozzles at positions respectively corresponding to the pressure chambers;
- a supply hole in the base plate connected to the first common chamber;
- a discharge hole in the base plate connected to the second common chamber; and
- a manifold on a lower surface side of the base plate, the manifold having:
  - a liquid supply flow path for supplying liquid to the supply hole from a liquid feed port on a lower surface side of the manifold,
  - a liquid discharge flow path for receiving liquid from the discharge hole, and
  - a temperature control flow path through which a temperature control liquid can flow, wherein
- the first common chamber is between a pair of actuators on the upper surface side of the base plate.

2. The liquid ejection head according to claim 1, further comprising:
- a maintenance pressure chamber at a longitudinal end portion of the actuator, wherein
- one end of the maintenance pressure chamber is connected to the second common chamber,
- an opposite end of the maintenance pressure chamber is connected to the discharge hole, and
- the nozzle plate includes at least one purge nozzle hole at a position corresponding to the maintenance pressure chamber.

3. The liquid ejection head according to claim 1, wherein the temperature control flow path includes an open groove in an upper surface of the manifold facing the base plate, and
the base plate covers the open groove.

4. The liquid ejection head according to claim 1, further comprising:
a liquid supply pipe connected to the liquid supply flow path via the liquid supply port;
a liquid discharge pipe connected to the liquid discharge flow path via a liquid discharge port on the lower surface side of the manifold, the liquid discharge port and the liquid supply port being on a first longitudinal end portion of the lower surface side of the manifold;
a first temperature control pipe connected to the temperature control flow path via a first temperature control port on the first longitudinal end portion of the lower surface side of the manifold; and
a second temperature control pipe connected to the temperature control flow path via a second temperature control port on a second longitudinal end portion of the lower surface side of the manifold, the second longitudinal end portion and the first longitudinal end portion being at opposite longitudinal ends of the manifold.

5. The liquid ejection head according to claim 1, wherein the actuator comprises piezoelectric material, and
the piezoelectric material forms sidewalls of each of the pressure chambers.

6. The liquid ejection head according to claim 1, further comprising:
a frame member on the upper surface side of the base plate, wherein
the frame member surrounds the actuator, the first common chamber, and the second common chamber, and
the nozzle plate is affixed to the frame member.

7. The liquid ejection head according to claim 1, wherein the base plate is directly attached to the manifold.

8. The liquid ejection head according to claim 1, wherein the liquid supply flow path comprises a first groove formed in the lower surface side of the manifold, and
the liquid discharge flow path comprises a second groove formed in the lower surface side of the manifold.

9. The liquid ejection head according to claim 8, further comprising:
a top plate fixed to the lower surface side of the manifold.

10. The liquid ejection head according to claim 1, wherein the supply hole is an elongated shape extending in a longitudinal direction of the base plate.

11. The liquid ejection head according to claim 1, wherein the liquid feed port comprises a liquid feed hole through the top plate and a first base block fixed to the top plate, and
the liquid discharge port comprises a liquid discharge hole through the top plate and a second base block fixed to the top plate.

12. The liquid ejection device according to claim 1, wherein the temperature control liquid is water.

13. A liquid ejection device, comprising:
a liquid feed pipe connectable to a storage tank; and
a liquid ejection head connected to the liquid feed pipe, the liquid ejection head including:
a base plate with a pair of actuators on an upper surface side of the base plate;
a plurality of pressure chambers formed in each actuator;
a first common chamber connected to a first side of the plurality of pressure chambers, the first common chamber being between the pair of actuators on the upper surface side of the base plate;
a second common chamber connected to a second side of the plurality of pressure chambers in one of the actuators, the pressure chambers in the one of the actuators connecting the first common chamber to the second common chamber;
a nozzle plate on an upper surface side of the pair of actuators and having a plurality of nozzles at positions respectively corresponding to the pressure chambers;
a supply hole in the base plate connected to the first common chamber;
a discharge hole in the base plate connected to the second common chamber; and
a manifold on a lower surface side of the base plate, the manifold having:
a liquid supply flow path for supplying liquid to the supply hole from a liquid feed port on a lower surface side of the manifold, the liquid feed port connected to the liquid supply pipe,
a liquid discharge flow path for receiving liquid from the discharge hole, and
a temperature control flow path through which a temperature control liquid can flow.

14. The liquid ejection device according to claim 13, further comprising:
a support facing the nozzle plate, the support configured to support an object while liquid is ejected from the liquid ejection head towards the object.

15. The liquid ejection device according to claim 13, further comprising:
a maintenance pressure chamber at a longitudinal end portion of one of the actuators, wherein
one end of the maintenance pressure chamber is connected to the second common chamber,
an opposite end of the maintenance pressure chamber is connected to the discharge hole, and
the nozzle plate includes at least one purge nozzle hole at a position corresponding to the maintenance pressure chamber.

16. The liquid ejection device according to claim 13, wherein
the temperature control flow path includes an open groove in an upper surface of the manifold facing the base plate, and
the base plate covers the open groove.

17. The liquid ejection device according to claim 13, further comprising:
a liquid discharge pipe connected to the liquid discharge flow path via a liquid discharge port on the lower surface side of the manifold, the liquid discharge port and the liquid supply port being on a first longitudinal end portion of the lower surface side of the manifold;
a first temperature control pipe connected to the temperature control flow path via a first temperature control port on the first longitudinal end portion of the lower surface side of the manifold; and
a second temperature control pipe connected to the temperature control flow path via a second temperature control port on a second longitudinal end portion of the lower surface side of the manifold, the second longitudinal end portion and the first longitudinal end portion being at opposite longitudinal ends of the manifold, wherein
the liquid feed pipe is connected to the liquid supply port.

18. The liquid ejection device according to claim 17, wherein the liquid discharge pipe is connected to the supply tank.

19. The liquid ejection device according to claim 13, further comprising:

a temperature control device configured to detect and adjust a temperature of the temperature control liquid.

* * * * *